United States Patent
Pai et al.

(10) Patent No.: US 12,299,090 B2
(45) Date of Patent: May 13, 2025

(54) REMOTE CREATION OF VIRTUAL CREDENTIAL BOUND TO PHYSICAL LOCATION

(71) Applicant: Capital One Services, LLC, McLean, VA (US)

(72) Inventors: Aditya Pai, San Francisco, CA (US); Allison Fenichel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 246 days.

(21) Appl. No.: 17/931,968

(22) Filed: Sep. 14, 2022

(65) Prior Publication Data
US 2024/0086500 A1 Mar. 14, 2024

(51) Int. Cl.
*G06F 21/31* (2013.01)

(52) U.S. Cl.
CPC .................................. *G06F 21/31* (2013.01)

(58) Field of Classification Search
CPC ...................................................... G06F 21/31
See application file for complete search history.

(56) References Cited

U.S. PATENT DOCUMENTS

| | | | |
|---|---|---|---|
| 2015/0142667 A1* | 5/2015 | Landrok | G06Q 20/326 705/67 |
| 2017/0034181 A1* | 2/2017 | Sharma | H04W 12/35 |
| 2018/0108008 A1* | 4/2018 | Chumbley | G06Q 20/3674 |
| 2019/0385159 A1* | 12/2019 | Beatty | G06Q 20/385 |
| 2022/0103360 A1* | 3/2022 | Verstraeten | G06Q 20/40 |

\* cited by examiner

*Primary Examiner* — Esther B. Henderson
(74) *Attorney, Agent, or Firm* — Harrity & Harrity, LLP (57) ABSTRACT

In some implementations, a credential system may create a virtual credential bound to a physical location associated with a transacting entity based on a request from a user device. The credential system may send information to a transaction terminal at the physical location bound to the virtual credential to register the virtual credential and identify a user that owns an account associated with the virtual credential. The credential system may provide, to the user device, tokenized information related to the virtual credential. The credential system may receive the tokenized information from a transaction terminal requesting authorization for the transaction. The credential system may send, to the transaction terminal requesting the authorization for the transaction, an authorization decision associated with the transaction based on whether the transaction terminal is present at the physical location bound to the virtual credential.

20 Claims, 6 Drawing Sheets

REMOTE CREATION OF VIRTUAL CREDENTIAL BOUND TO PHYSICAL LOCATION

BACKGROUND

A virtual credential, sometimes referred to as a virtual payment credential, a virtual card number, and/or a virtual credit card, among other examples, is a computer-generated version of a primary payment credential (e.g., a credit card number). The virtual credential may be linked to the primary payment credential and used as a substitute for the primary payment credential in a transaction (e.g., when shopping online, by phone, or in other contexts where a transaction card is not required to be physically presented to a merchant). For example, a bank may issue a transaction card (e.g., a credit card), and a transaction management system of the bank may also issue one or more virtual card numbers that can be used with different merchant transaction systems. In this case, the transaction management system may configure each virtual credential to be associated with a particular merchant. For example, a first virtual credential may be usable with a first merchant only, a second virtual credential may be usable with a second merchant only, and so on. Each virtual credential may be linked to the primary credential in the transaction management system to enable transactions using a particular virtual credential to be charged to an account associated with the primary credential.

SUMMARY

Some implementations described herein relate to a system for enabling an in-person card-not-present transaction. The system may include one or more memories and one or more processors communicatively coupled to the one or more memories. The one or more processors may be configured to create a mapping between physical locations associated with transacting entities and transaction terminals at the physical locations associated with the transacting entities based on historical transaction records received from a transaction backend system. The one or more processors may be configured to receive, from a user device, a request to create a virtual credential bound to a physical location associated with a transacting entity. The one or more processors may be configured to create, based on the request from the user device, the virtual credential bound to the physical location associated with the transacting entity. The one or more processors may be configured to send, to one or more transaction terminals at the physical location bound to the virtual credential, information to register the virtual credential and identify a user that owns an account associated with the virtual credential. The one or more processors may be configured to provide, to the user device, tokenized information related to the virtual credential based on a determination that a user attempting to authorize a transaction using the virtual credential is the user that owns the account associated with the virtual credential. The one or more processors may be configured to receive, from a transaction terminal requesting authorization for the transaction, the tokenized information related to the virtual credential. The one or more processors may be configured to send, to the transaction terminal requesting the authorization for the transaction, an authorization decision associated with the transaction based on whether the transaction terminal is present at the physical location bound to the virtual credential.

Some implementations described herein relate to a method for enabling an in-person card-not-present transaction. The method may include creating, by a credential system, a virtual credential bound to a physical location associated with a transacting entity based on a request from a user device that identifies the physical location associated with the transacting entity. The method may include sending, by the credential system, to one or more transaction terminals at the physical location bound to the virtual credential, information to register the virtual credential and identify a user that owns an account associated with the virtual credential. The method may include providing, by the credential system, to the user device, tokenized information related to the virtual credential based on a determination that a user attempting to authorize a transaction using the virtual credential is the user that owns the account associated with the virtual credential. The method may include receiving, by the credential system, from a transaction terminal requesting authorization for the transaction, the tokenized information related to the virtual credential. The method may include sending, by the credential system, to the transaction terminal requesting the authorization for the transaction, an authorization decision associated with the transaction based on whether the transaction terminal is present at the physical location bound to the virtual credential.

Some implementations described herein relate to a non-transitory computer-readable medium that stores a set of instructions for a credential system. The set of instructions, when executed by one or more processors of the credential system, may cause the credential system to receive, from a user device, a request to create a virtual credential bound to a physical location associated with a transacting entity. The set of instructions, when executed by one or more processors of the credential system, may cause the credential system to create, based on the request from the user device, the virtual credential bound to the physical location associated with the transacting entity. The set of instructions, when executed by one or more processors of the credential system, may cause the credential system to send, to one or more transaction terminals at the physical location bound to the virtual credential, information to register the virtual credential and identify a user that owns an account associated with the virtual credential. The set of instructions, when executed by one or more processors of the credential system, may cause the credential system to provide, to the user device, tokenized information related to the virtual credential based on a determination that a user attempting to authorize a transaction using the virtual credential is the user that owns the account associated with the virtual credential. The set of instructions, when executed by one or more processors of the credential system, may cause the credential system to receive, from a transaction terminal requesting authorization for the transaction, the tokenized information related to the virtual credential. The set of instructions, when executed by one or more processors of the credential system, may cause the credential system to send, to the transaction terminal requesting the authorization for the transaction, an authorization decision associated with the transaction based on whether the transaction terminal is present at the physical location bound to the virtual credential.

DETAILED DESCRIPTION

The following detailed description of example implementations refers to the accompanying drawings. The same reference numbers in different drawings may identify the same or similar elements.

As described herein, a virtual credential is a computer-generated version of a primary payment credential that may be linked to the primary payment credential and used as a substitute for the primary payment credential in a transaction. Accordingly, because virtual credentials can generally be used in the same way as a typical credit card, virtual credentials can offer increased security in transactions that use stored credentials (e.g., card-on-file payments). For example, a stored credential (or card-on-file) generally refers to a payment method, such as a credit card number and/or associated information (e.g., an expiration date, security code, name, and/or billing address), that may be stored at a merchant system and saved for future transactions. For example, in a consumer-initiated transaction, a consumer may provide a merchant with a payment credential in order to actively enter into a transaction (e.g., an in-person transaction at a point-of-sale and/or an online transaction at a merchant website, among other examples). In some cases, the consumer may elect to save the payment credential to avoid having to re-enter the information associated with the payment credential in subsequent consumer-initiated transactions and/or merchant-initiated transactions using the stored credentials (e.g., for recurring or automatic payments, such as subscriptions, utility payments, and/or account top-ups).

In general, using a virtual credential as a stored credential can provide additional security and robustness against fraud relative to using the actual payment credential. For example, if a consumer were to store a primary payment credential at a merchant system, and there is a security breach of the merchant system, the primary payment credential can be exposed or otherwise compromised (e.g., to a hacker or fraudster), which may lead to unrestricted fraudulent use of the primary payment credential. On the other hand, if a merchant-bound virtual credential were to be stored at the merchant system and subsequently exposed or compromised in a security breach, the virtual credential could only be used in fraudulent activity through the particular merchant and the virtual credential would be unusable with any other merchants. In this way, using the virtual credential as the stored credential may reduce a risk and/or an extent to which the virtual credential can be fraudulently used, thereby improving information security and/or reducing monetary losses relative to use of a regular payment credential. In such a case, the compromised virtual credential may simply be invalidated and a new virtual credential may be generated without affecting the primary payment credential and/or any other virtual credentials that may be linked to the primary payment credential. Furthermore, virtual credentials may provide similar protection against phishing scams or other fraud or abuse by unscrupulous merchants. This may minimize an inconvenience associated with issuing a new primary payment credential and may reduce utilization of network resources associated with updating many different merchant systems with new payment credentials. However, although binding a virtual credential to a particular merchant can improve security and/or reduce a risk of credit card fraud, existing systems generally limit usage of virtual credentials to online transactions (e.g., electronic commerce). In other words, virtual credentials generally cannot be used to perform in-person transactions at a point-of-sale, which typically require that a physical credit card be swiped at, tapped against, and/or inserted into a point-of-sale terminal or otherwise presented at the point-of-sale terminal in order to verify an identity of the consumer.

Some implementations described herein relate to a credential system that can be used to enable remote creation of a virtual credential that can be bound to a specific physical location (e.g., the virtual credential is bound to the specific physical location in the sense that the virtual credential is restricted to be valid at the specific physical location and otherwise invalid at any other location). More particularly, as described herein, the credential system may be used to generate or otherwise create a virtual credential that is bound to a specific physical location associated with a specific merchant, whereby the virtual credential may be valid only at the specific physical location associated with the specific merchant (e.g., a specific geographical point and/or area corresponding to a building, a structure, or another place where the merchant conducts in-person transactions). In this way, the virtual credential may be used in an in-person transaction at the specific physical location associated with the specific merchant, without a user having to carry or present a physical credit card (or other transaction device) at the physical location of the merchant. For example, in some implementations, the credential system may receive raw transaction records from a transaction backend system, where each raw transaction record may include merchant metadata with various merchant attributes. Accordingly, the credential system may map the merchant attributes included in the raw transaction records to granular merchant information, including physical merchant locations, which may be used to create a mapping between physical merchant locations and identifiers of one or more transaction terminals at the physical merchant locations (e.g., the mapping may be defined using one or more data structures that associate merchant keys that uniquely identify various merchants with one or more physical locations where each respective merchant conducts in-person transactions, and that further associate each physical location with identifiers of one or more transaction terminals at the respective physical location).

In some implementations, a user device may provide, to the credential system, a request to create a virtual credential bound to a specific physical merchant location where a user of the user device intends to enter into an in-person transaction (e.g., by selecting the physical merchant location on a map or entering an address of the physical merchant location) and may configure a multi-factor authentication (MFA) method to authorize usage of the virtual credential at the physical merchant location bound to the virtual credential. Accordingly, the credential system may send, to the one or more transaction terminals at the physical merchant location, information to register the virtual credential and information associated with the user. When the user visits the physical merchant location, the user may authorize an in-person payment by successfully completing the configured MFA method, and a transaction terminal at the physical merchant location may send a request to authorize the in-person payment to the credential system (e.g., via the transaction backend system). The credential system may then verify whether the virtual credential is being used at the correct physical merchant location. For example, the credential system may verify whether the virtual credential is being used at the correct physical merchant location based on a location of the user device used to complete the MFA method (e.g., which should match the physical merchant location bound to the virtual credential) and/or information included in the authorization request from the transaction terminal (e.g., the terminal identifier, which should match one of the transaction terminal identifiers mapped to the physical merchant location). Accordingly, in some implementations, the credential system may send an authorization decision to the transaction terminal (e.g., via the transaction backend system) based on whether the virtual credential is being used at the correct physical merchant location.

In this way, the credential system may be used to remotely create a virtual credential bound to a specific physical location, which may improve security of the virtual credential because the virtual credential is valid only at a specific physical location. Furthermore, by enabling usage of the virtual credential in an in-person transaction, security of the virtual credential may be improved by avoiding a need to present and/or communicate the virtual credential to the transaction terminals at the physical merchant location. For example, when the user device is successfully used to complete the configured MFA method, tokenized information associated with the virtual credential may be provided to the transaction terminal and used to complete the in-person transaction. In this way, the actual virtual credential is not exposed to the transaction terminal, which may prevent use of the virtual credential in fraudulent activity.

Figure 1A:
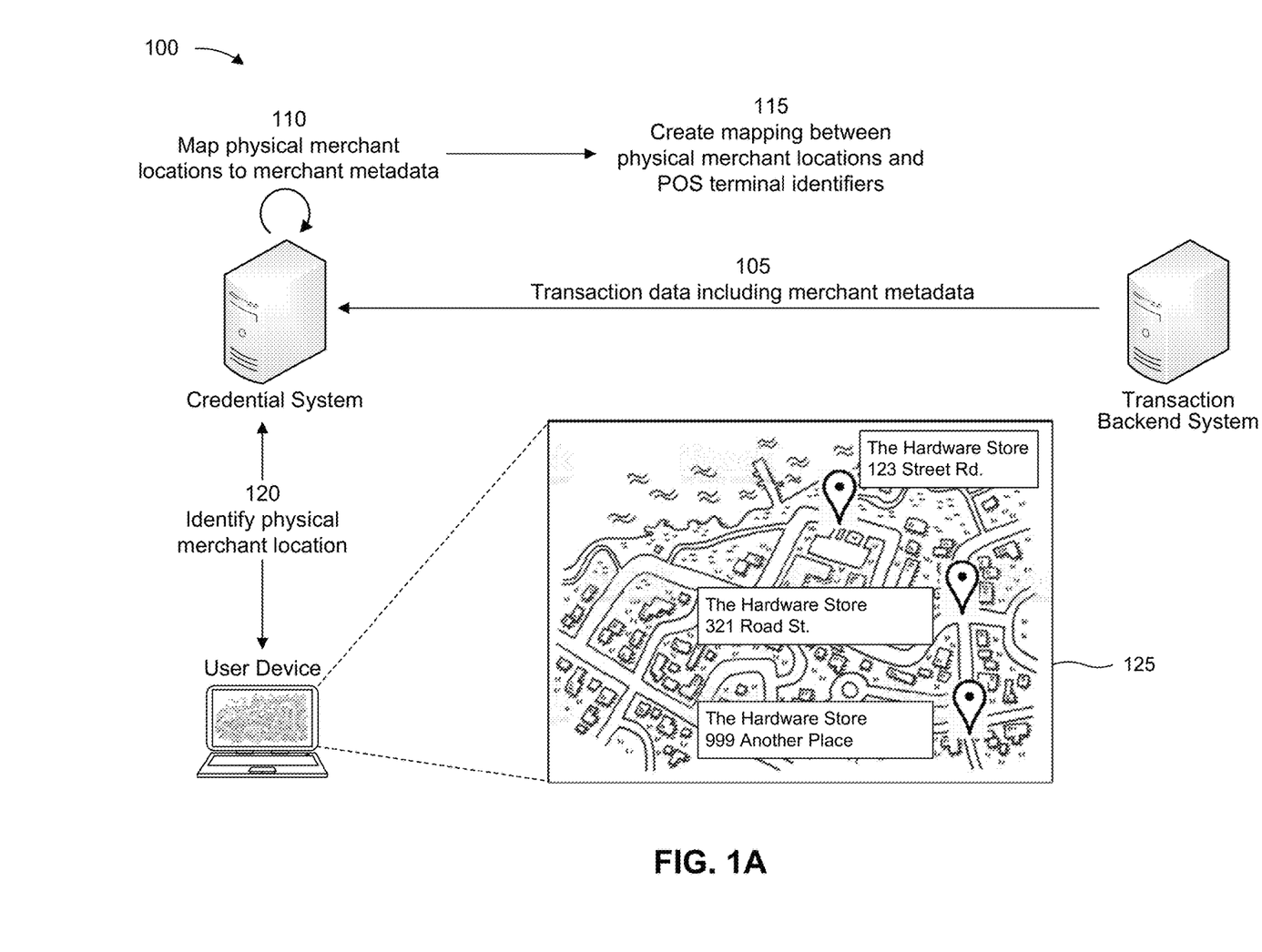
FIGS. 1A-1C are diagrams of an example implementation associated with remote creation of a virtual credential bound to a physical location, in accordance with some embodiments of the present disclosure.
Figure 1B:
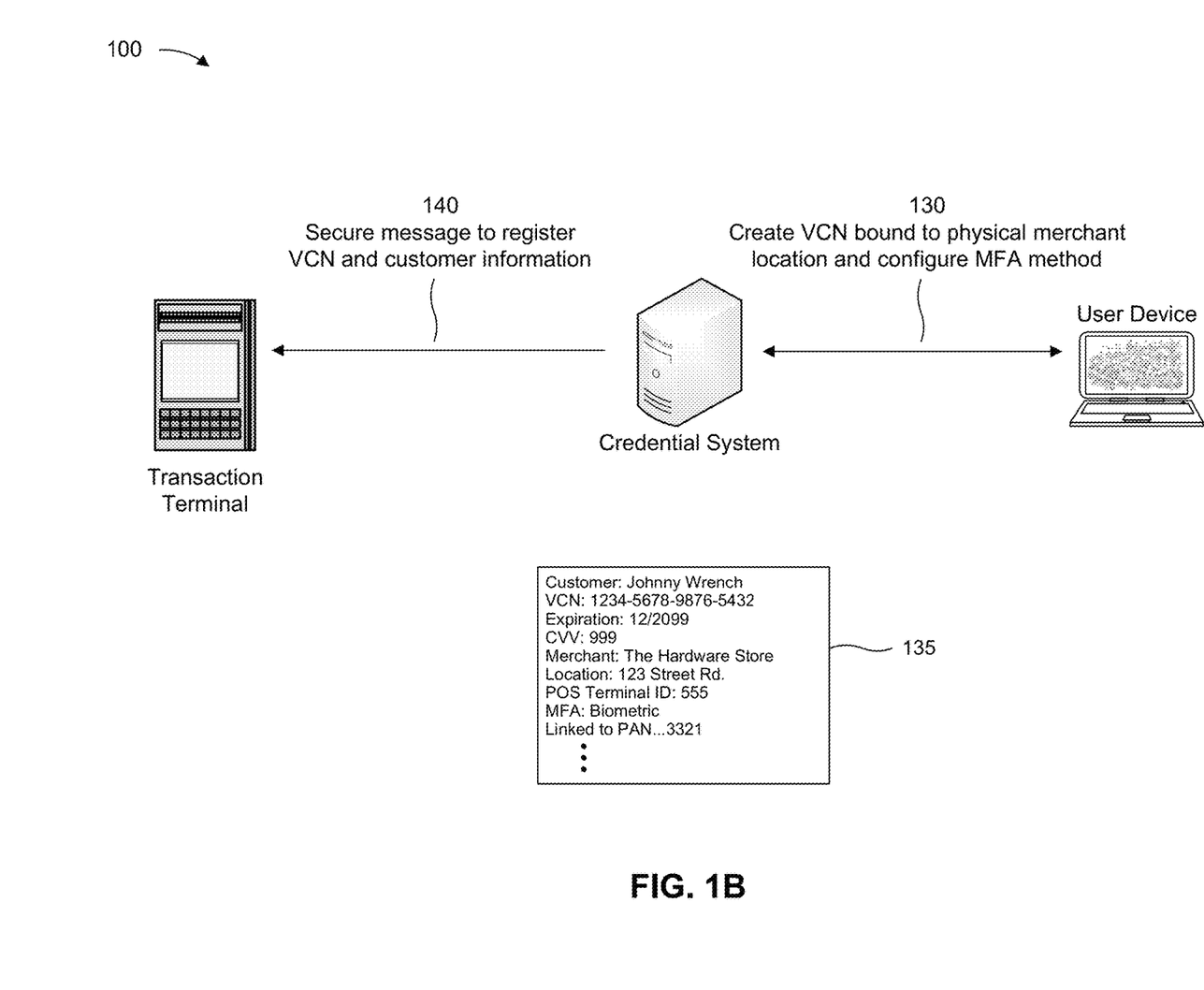
Figure 1C:
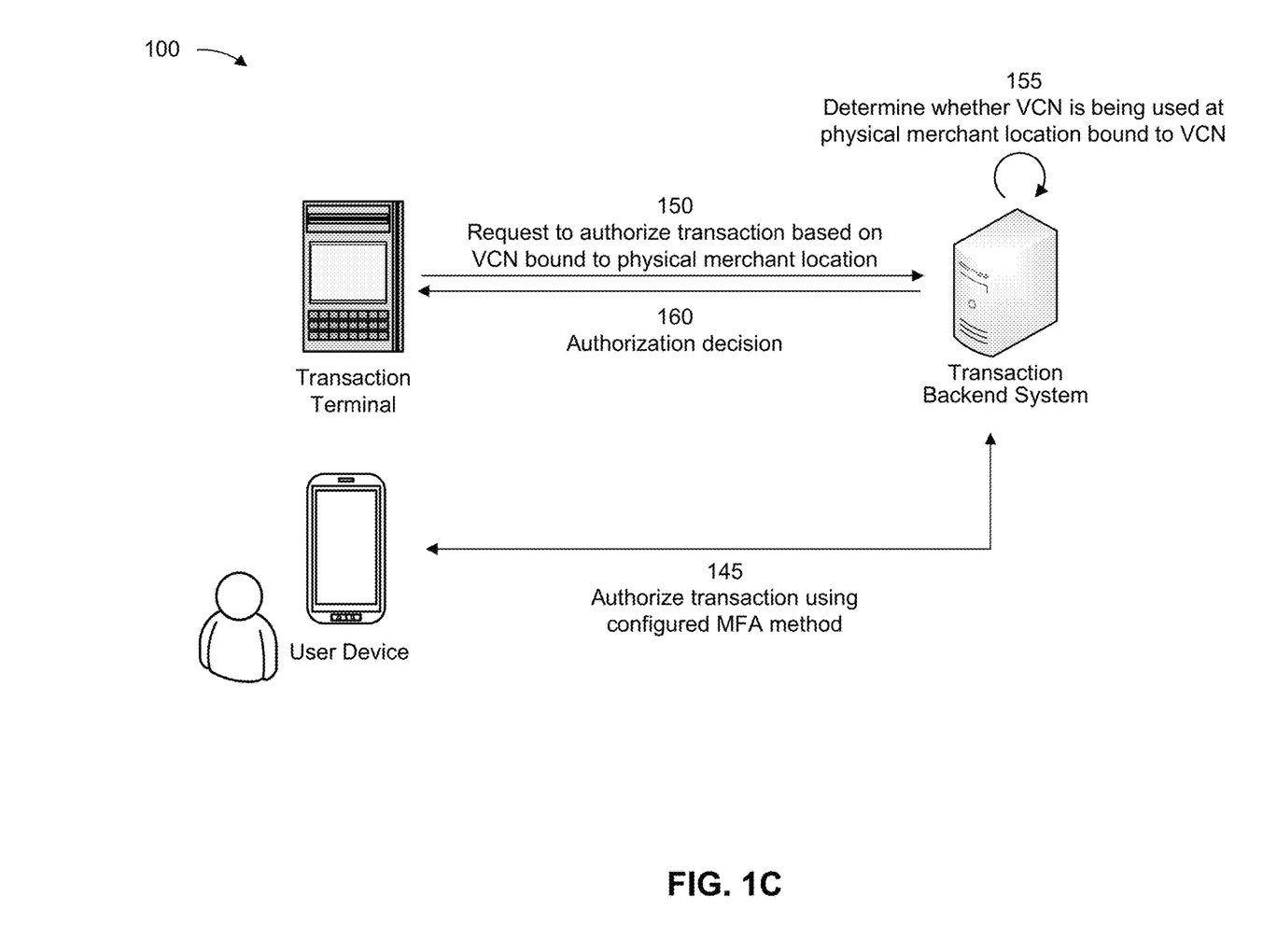

FIGS. 1A-1C are diagrams of an example 100 associated with remote creation of a virtual credential bound to a physical location. As shown in FIGS. 1A-1C, example 100 includes a credential system, transaction backend system, a user device, and a transaction terminal. The credential system, the transaction backend system, the user device, and the transaction terminal devices are described in more detail in connection with FIG. 2 and FIG. 3.

As shown in FIG. 1A, and by reference number 105, the credential system may receive raw transaction data from the transaction backend system, where the raw transaction data includes merchant metadata associated with various transactions processed via the transaction backend system. For example, in some implementations, the transaction backend system and the credential system may be associated with a financial institution (e.g., a bank, a lender, a credit card company, or a credit union) and/or a transaction card association that authorizes transactions and/or facilitate transfers of funds. In some implementations, each raw transaction record that the credential system receives from the transaction backend system may be associated with various fields, which may include information related to the customer, the merchant, and the transaction between the customer and the merchant. For example, the various fields related to the customer may include a customer identifier, a cardholder name, a cardholder account number, and/or a card expiration date, among other examples. Furthermore, the fields related to the merchant may include a merchant name, address, city, state, zip code, country, and/or merchant category code (MCC) information (e.g., a category code group, a category code number, and/or a category code description) that categorizes the merchant into a market segment. For example, MCCs from 4000-4799 generally represent merchants that provide transportation services, MCCs from 5000-5599 represent merchants that provide retail outlet services, MCCs from 7300-7999 represent merchants that provide business services, and MCCs from 9000-9999 represent merchants that provide government services, among other examples. Furthermore, the fields related to the transaction may include an initial authorized amount, a final amount (e.g., accounting for a tip added to the authorized amount and/or other post-authorization processing), a date and/or time associated with the transaction, a point-of-sale (POS) entry mode, a POS terminal identifier, and/or an approval code, among other examples.

As further shown in FIG. 1A, and by reference number 110, the credential system may map physical merchant locations to the merchant metadata included in the raw transaction records. For example, in some implementations, the credential system may determine or otherwise obtain a set of merchant keys based on the raw transaction records received from the transaction backend system, where a merchant key may generally include a combination of fields that is sufficient to uniquely identify a merchant. For example, in some implementations, the merchant key may include a name, a city, a state, a zip code, a country, and a category code (e.g., an MCC) that is unique to a particular merchant. Accordingly, because merchant information typically does not change or changes infrequently, the information in the merchant key may be common to all raw transaction records that share the same combination of fields. Furthermore, the merchant key may be used to distinguish different business locations for the same merchant (e.g., different retail locations and/or regional offices) and/or different businesses that a merchant may operate at a single location (e.g., at a superstore that includes grocery store associated with a first MCC and a pharmacy associated with a second MCC). Accordingly, in some implementations, the set of merchant keys determined or obtained by the credential system may provide an index to enhancement data (e.g., information associated with the merchant that is expressed using a standard format and/or additional provides more granular information about the merchant that may not be included in the transaction records). For example, as described herein, each merchant key may be mapped to a closest match in a database that includes more granular merchant data to indicate the physical location of the corresponding merchant, such as a full street address and geographic coordinates (e.g., a latitude and longitude or other suitable information identifying a specific geographical point and/or area corresponding to a building, a structure, or other place where the merchant conducts in-person transactions).

As further shown in FIG. 1A, and by reference number 110, the credential system may create a mapping between physical merchant locations and POS terminal identifiers at the physical merchant locations. For example, in some implementations, the raw transaction records that are received from the transaction backend system may include, in addition to information identifying a consumer and a merchant associated with each respective transaction, information associated with the transaction, such as an amount of the transaction, a date and time of the transaction, and an identifier of a POS terminal (or transaction terminal) that was used to request authorization for the transaction. Accordingly, as described above, the credential system may use the merchant metadata included in the raw transaction records to identify one or more physical locations that are operated by a particular merchant (e.g., street addresses and/or geographic coordinates associated with one or more brick-and-mortar stores), and the credential system may map each physical merchant location to one or more POS terminal identifiers based on the POS terminal identifiers included in the raw transaction records. In this way, the credential system may have access to a mapping that indicates one or more physical locations that are operated by a particular merchant and identifiers of one or more POS terminals that are present at each of the one or more physical locations.

As further shown in FIG. 1A, and by reference number 120, the user device may access the credential system and may identify a physical merchant location. For example, as described herein, the credential system may be associated with a financial institution, such as a bank or a credit card, and a user of the user device may own one or more accounts that are managed through the credential system (e.g., the user may be a holder of the one or more accounts or a person who is authorized to enter into transactions using the one or more accounts). For example, in some implementations, the one or more accounts may include a credit card account, a checking account, a savings account, an investment account, or another suitable account type. Furthermore, in some implementations, the one or more accounts may each be associated with a primary account number (PAN) or a primary payment credential that can be used to enter into transactions using the associated account. For example, the PAN or primary payment credential may be associated with a credit card, whereby amounts associated with transactions that are performed using the credit card may be added to a balance of the PAN or primary payment credential. In another example, the PAN or primary payment credential may be associated with a debit card, whereby amounts associated with transactions that are performed using the debit card may be deducted from a balance of the PAN or primary payment credential (e.g., from a balance in a checking or savings account).

Accordingly, in cases where a user of the user device is planning to enter into an in-person transaction at a particular physical merchant location, the user may access the credential system via the user device in order to identify the physical merchant location. For example, in some implementations, the user device may be used to access a portal associated with the account(s) managed through the credential system, where the portal may be accessed via a web browser, a mobile application, a shopping application, or another suitable interface that may be used to view, select, or otherwise identify a specific physical merchant location. For example, referring to FIG. 1A, reference number 125 depicts an example graphical user interface that may be presented via the user device based on the user device being used to request information on physical locations associated with a merchant doing business as "The Hardware Store." In some examples, the graphical user interface may take the form of a map that indicates one or more physical merchant locations that are in the vicinity of a location of the user device (e.g., based on the user device sharing its location with the credential system) or a location that is input by the user device (e.g., the user may enter search criteria for physical merchant locations in a certain city or physical merchant locations that are near an indicated street address or other suitable location). Additionally, or alternatively, the user device may be used to specify one or more criteria to indicate a location where the user intends to engage in one or more in-person transactions (e.g., the user may be planning a shopping trip in an area where there are several stores, such as a shopping mall, and may request information related to different merchants that operate physical merchant locations in the identified area).

As further shown in FIG. 1B, and by reference number 130, the user device may communicate with the credential system to create a virtual credential (e.g., a virtual card number (VCN)) that is bound to a specific physical location associated with a transacting entity (e.g., the virtual credential is bound to the specific physical location in the sense that the virtual credential is restricted to be valid at the specific physical location associated with a transacting entity and otherwise invalid at any other location and/or with any other entity). For example, as described herein, the transacting entity may include a merchant that conducts business at the specific physical location, although it will be appreciated that the transacting entity may include any suitable entity that conducts business or otherwise participates in in-person transactions at the specific physical location (e.g., a person who conducts regular sales at their home and has appropriate infrastructure to accept credit card payments). Furthermore, during a session to create or manage the virtual credential, the user device may communicate with the credential system to configure an MFA method to be used to authorize in-person transactions in which the virtual credential is used at the specific physical merchant location. For example, in some implementations, the user device may send a request to the credential system that identifies a specific physical merchant location, which may be selected from a map, entered into a search interface (e.g., according to a merchant name and address), and/or identified using any other suitable technique. Furthermore, in some implementations, the user device may indicate a PAN or primary payment credential to be linked to the virtual credential. Accordingly, as shown by reference number 135, the credential system may generate the virtual credential that is bound to the specific physical merchant location identified by the user device. For example, as shown, the virtual credential may include a token (e.g., a sixteen-digit number) that has a similar format and structure as a typical credit card and is associated with other information (e.g., an expiration date and card verification value (CVV)) that enables the virtual credential to be used in the same manner as a typical credit card. Furthermore, as shown, the virtual credential may be associated with a specific physical location associated with a particular merchant (e.g., the 123 Street Rd. location of The Hardware Store in the illustrated example). Accordingly, the credential system may reference the mapping between POS terminal identifiers and physical merchant locations to identify one or more POS terminals at the specific physical merchant location. Furthermore, as shown, the virtual credential may be associated with an MFA method that the user device must successfully complete in order to authorize an in-person transaction using the virtual credential. For example, in some implementations, the MFA method may include a biometric authentication method, such as a facial recognition, fingerprint identification, or other suitable biometric authentication method. In other examples, the MFA method may include a personal identification number (PIN) authentication method (e.g., where the user has to enter a PIN, password, or passphrase associated with the virtual credential or the PAN or primary credential linked to the virtual credential in order to authorize a transaction using the virtual credential) and/or a text-message-based authentication method (e.g., where the credential system sends a text message containing a one-time password (OTP) that the user must enter into a suitable interface to authorize a transaction using the virtual credential). In some implementations, the MFA method may be configured during the session when the virtual credential is created, and/or may be configured or reconfigured during a session to manage the virtual credential.

As further shown in FIG. 1B, and by reference number 140, the credential system may send a secure message to one or more POS terminals at the physical merchant location bound to the virtual credential that was requested by the user device. For example, as described herein, the user device may generally request that the credential system create or otherwise generate a virtual credential that is valid only for in-person transactions at a particular physical location associated with a merchant, and the credential system may reference the mapping between physical merchant locations and transaction terminal identifiers to determine the identifiers of one or more transaction terminals present at the physical merchant location bound to the virtual credential. Accordingly, in some implementations, the credential system may send a secure message to each of the one or more POS terminals that are present at the physical merchant location bound to the virtual credential, where the secure message may include information to register information associated with the virtual credential, and information associated with the user that is authorized to enter into transactions using the virtual credential. For example, the information that the credential system registers for the virtual credential may include the token (e.g., sixteen-digit number), expiration date, and CVV associated with the virtual credential. Additionally, or alternatively, the information that the credential system registers for the virtual credential may include a reference token that corresponds to a unique string that is substituted for the token associated with the virtual credential (e.g., such that the reference token, or tokenized information associated with the virtual credential, cannot be used to enter into a transaction if the reference token happens to be exposed or otherwise compromised in a data breach). In any case, the registered information associated with the virtual credential may be stored at the transaction terminal(s) located at the physical merchant location such that the registered information can be used to request authorization for an in-person transaction without requiring presentation of any physical transaction card. In addition, the credential system may register information associated with the user who owns the corresponding account such that personnel at the physical merchant location can verify the identity of a person that attempts to authorize a transaction using the virtual credential. For example, the information associated with the user may include a name, billing and/or shipping address, telephone number, and/or other suitable information.

As shown in FIG. 1C, and by reference number 145, the user device may communicate with the transaction backend system (or the credential system) to authorize an in-person transaction using the virtual credential by successfully performing the MFA method that was previously configured for the virtual credential. For example, when the user is at the physical merchant location bound to the virtual credential, the user may use the user device to access the credential system to retrieve a payment token using personal information that is provided via a suitable interface. For example, in some implementations, the user may access a website, mobile application, or other portal used to manage the PAN or primary credential linked to the virtual credential, and may enter personal information (e.g., a username, password, phone number, name, or the like) to access the account associated with the PAN or primary credential linked to the virtual credential. In some implementations, the user device may then obtain tokenized information associated with the virtual credential if the personal information provided by the user device is authenticated, and the user device may authorize a payment using the tokenized information by successfully completing a biometric authentication, a PIN-based authentication, a text-message-based authentication, or another suitable MFA method.

As further shown in FIG. 1C, and by reference number 150, a transaction terminal may send a request to authorize a transaction using the virtual credential to the transaction backend system. For example, in some implementations, the user device may communicate with the transaction terminal to send the tokenized information associated with the virtual credential to the transaction terminal (e.g., using a digital wallet associated with the user device, a tap-to-pay application running on the user device, or another suitable technique), and the transaction terminal may then send the tokenized information to the transaction backend system to request the authorization for the in-person transaction. Additionally, or alternatively, as described elsewhere herein, information associated with the virtual credential (e.g., tokenized information associated with the virtual credential) may be registered at the transaction terminal associated with the physical merchant location, and the registered information associated with the virtual credential may be linked to information associated with the user that is authorized to enter into an in-person transaction using the virtual credential. In this example, personnel operating the transaction terminal may verify an identity of the user (e.g., based on a driver's license or other identification documents), or the user device may present information that can be used to verify the identity of the user device (e.g., a quick response (QR) code that is generated and displayed on the user device to indicate that the identity of the user has been verified by the credential system or the transaction backend system).

In any case, as shown by reference number 155, the transaction backend system may then determine whether the virtual credential is being used at the correct physical merchant location bound to the virtual credential. For example, in some implementations, the authorization request from the transaction terminal may include an identifier of the transaction terminal and various merchant attributes (e.g., a merchant name, address, city, state, zip code, MCC, or the like), and the transaction backend system may map the merchant attributes to a physical location using similar techniques described elsewhere herein. Accordingly, the transaction backend system may determine whether the merchant attributes provided in the authorization request from the transaction terminal match the physical merchant location bound to the virtual credential (e.g., a physical location mapped to the merchant attributes provided in the authorization request is the same as the physical merchant location bound to the virtual credential). Furthermore, the transaction backend system may determine whether the identifier of the transaction terminal requesting the authorization for the transaction is included among the transaction terminal identifiers mapped to the physical merchant location bound to the virtual credential. In this way, as shown by reference number 160, the transaction backend system may determine whether the virtual credential is being used at the correct physical merchant location bound to the virtual credential, and may return an authorization decision to the transaction terminal accordingly. For example, in some implementations, the authorization decision may indicate that the transaction is authorized in cases where the merchant attributes and transaction terminal identifier are associated with the physical merchant location and bound to the virtual credential, or may indicate that the transaction is declined or rejected in cases where the merchant attributes and transaction terminal identifier mismatch the physical merchant location and/or associated transaction terminal identifiers bound to the virtual credential. Additionally, or alternatively, in some cases, the transaction backend system may perform a further verification that the virtual credential is being used at the correct physical merchant location based on location data shared by the user device. For example, the user device may approve sharing of location data with the transaction backend system, and the authorization decision may indicate that the transaction is approved only if the current location of the user device is within a threshold distance of the physical merchant location bound to the virtual credential. For example, the user device may share geographic (e.g., a latitude and longitude) coordinates of the user device at the time that the user device is attempting to authorize a transaction using the virtual credential, and the credential system or transaction backend system may authorize the transaction only if the geographic coordinates of the user device are within a threshold distance of geographic coordinates corresponding to the physical merchant location bound to the virtual credential.

As indicated above, FIGS. 1A-1C are provided as an example. Other examples may differ from what is described with regard to FIGS. 1A-1C.

Figure 2:
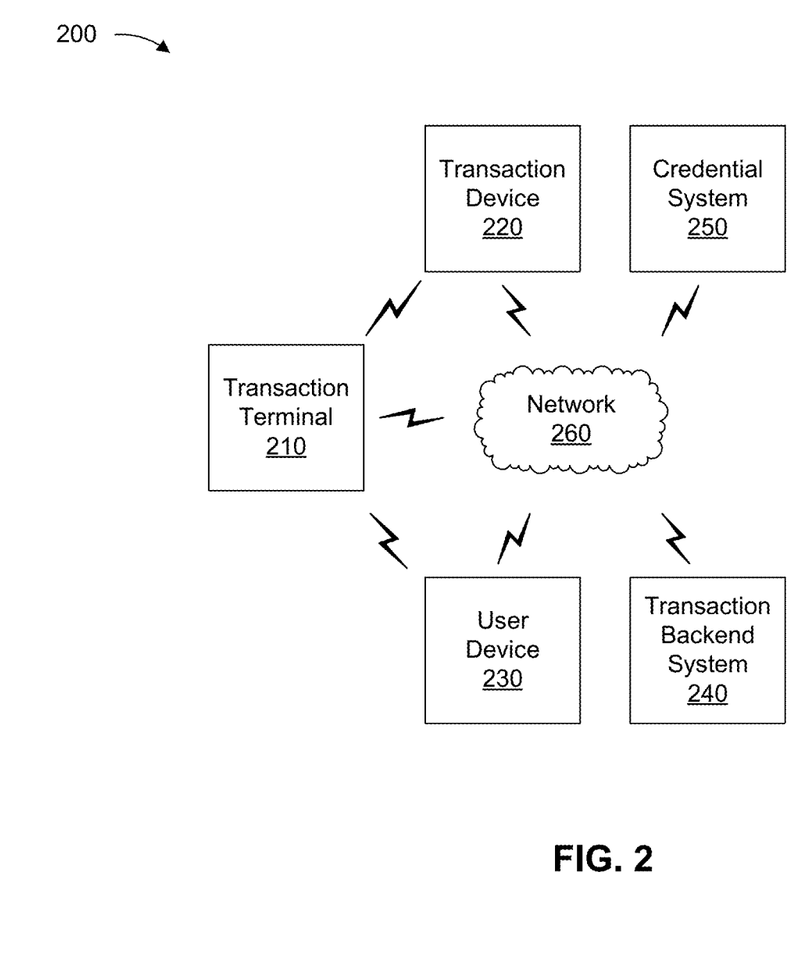
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a transaction terminal 210, a transaction device 220, a user device 230, a transaction backend system 240, a credential system 250, and/or a network 260. Devices of environment 200 may interconnect via wired connections and/or wireless connections.

The transaction terminal 210 may include one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 may include one or more devices capable of being used for an electronic transaction. In some implementations, the transaction device 220 may include a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the user device 230 or may be integrated into the user device 230. For example, the user device 230 may execute an electronic payment application capable of performing functions of the transaction device 220 described herein. Thus, one or more operations described herein as being performed by the transaction device 220 may be performed by a transaction card, the user device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The user device 230 may include one or more devices capable of being used for an electronic transaction, as described above in connection with the transaction device 220. The user device 230 may include a communication device and/or a computing device. For example, the user device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 230 may be capable of receiving, generating, storing, processing, and/or providing information associated with remote creation of a virtual credential bound to a physical location (e.g., a virtual credential that is valid only at a physical location of the transaction terminal 210), as described elsewhere herein.

The transaction backend system 240 may include one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTER-CARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The credential system 250 may include one or more devices capable of receiving, generating, storing, processing, providing, and/or routing information associated with a virtual credential bound to a physical location, as described elsewhere herein. The credential system 250 may include a communication device and/or a computing device. For example, the credential system 250 may include a server, such as an application server, a client server, a web server, a database server, a host server, a proxy server, a virtual server (e.g., executing on computing hardware), or a server in a cloud computing system. In some implementations, the credential system 250 may include computing hardware used in a cloud computing environment.

The network 260 may include one or more wired and/or wireless networks. For example, the network 260 may include a cellular network, a public land mobile network, a local area network, a wide area network, a metropolitan area network, a telephone network, a private network, the Internet, and/or a combination of these or other types of networks. The network 260 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
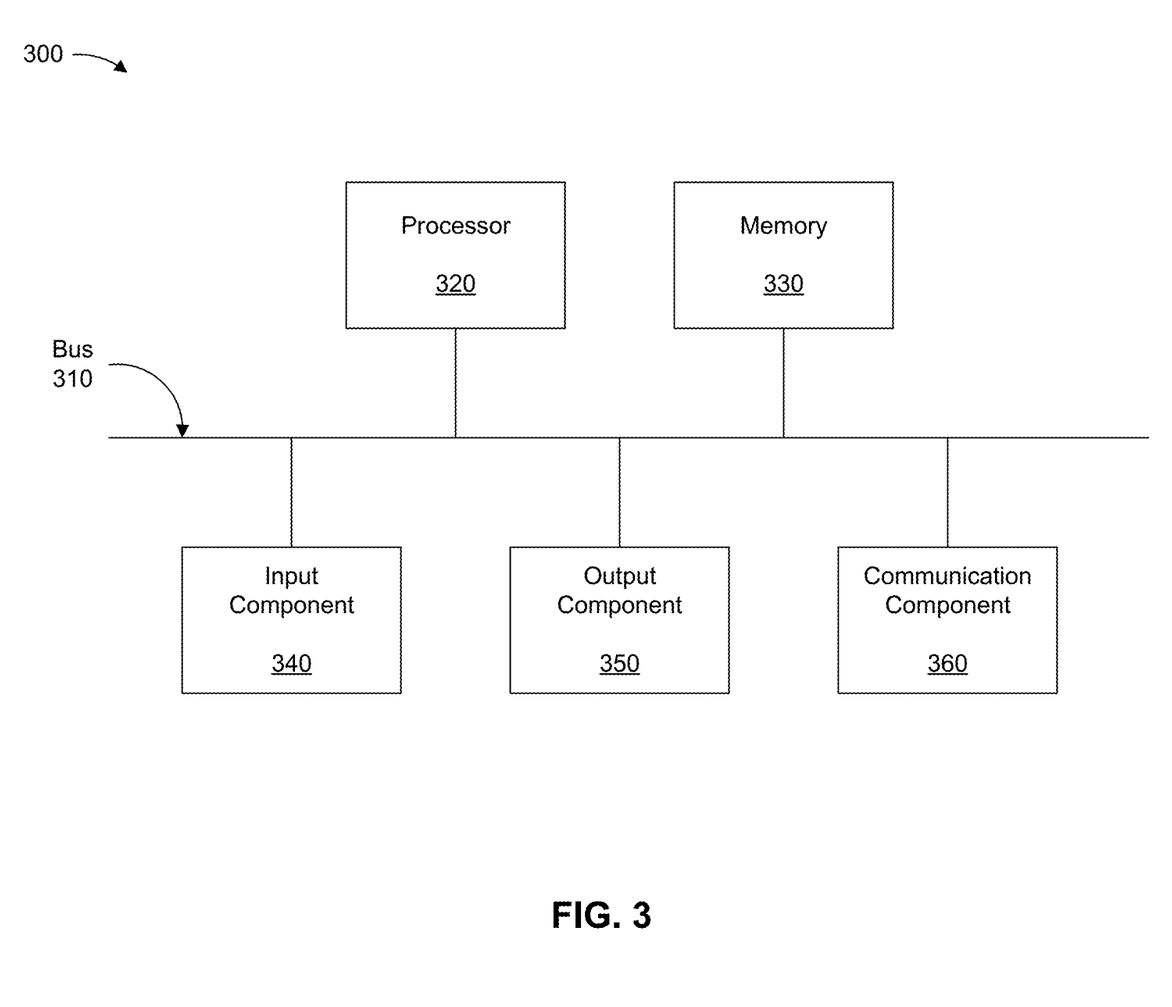
FIG. 3 is a diagram of example components of one or more devices of FIG. 2, in accordance with some embodiments of the present disclosure.

FIG. 3 is a diagram of example components of a device 300 associated with remote creation of a virtual credential bound to a physical location. The device 300 may correspond to the transaction terminal 210, the transaction device 220, the user device 230, the transaction backend system 240, and/or the credential system 250. In some implementations, the transaction terminal 210, the transaction device 220, the user device 230, the transaction backend system 240, and/or the credential system 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
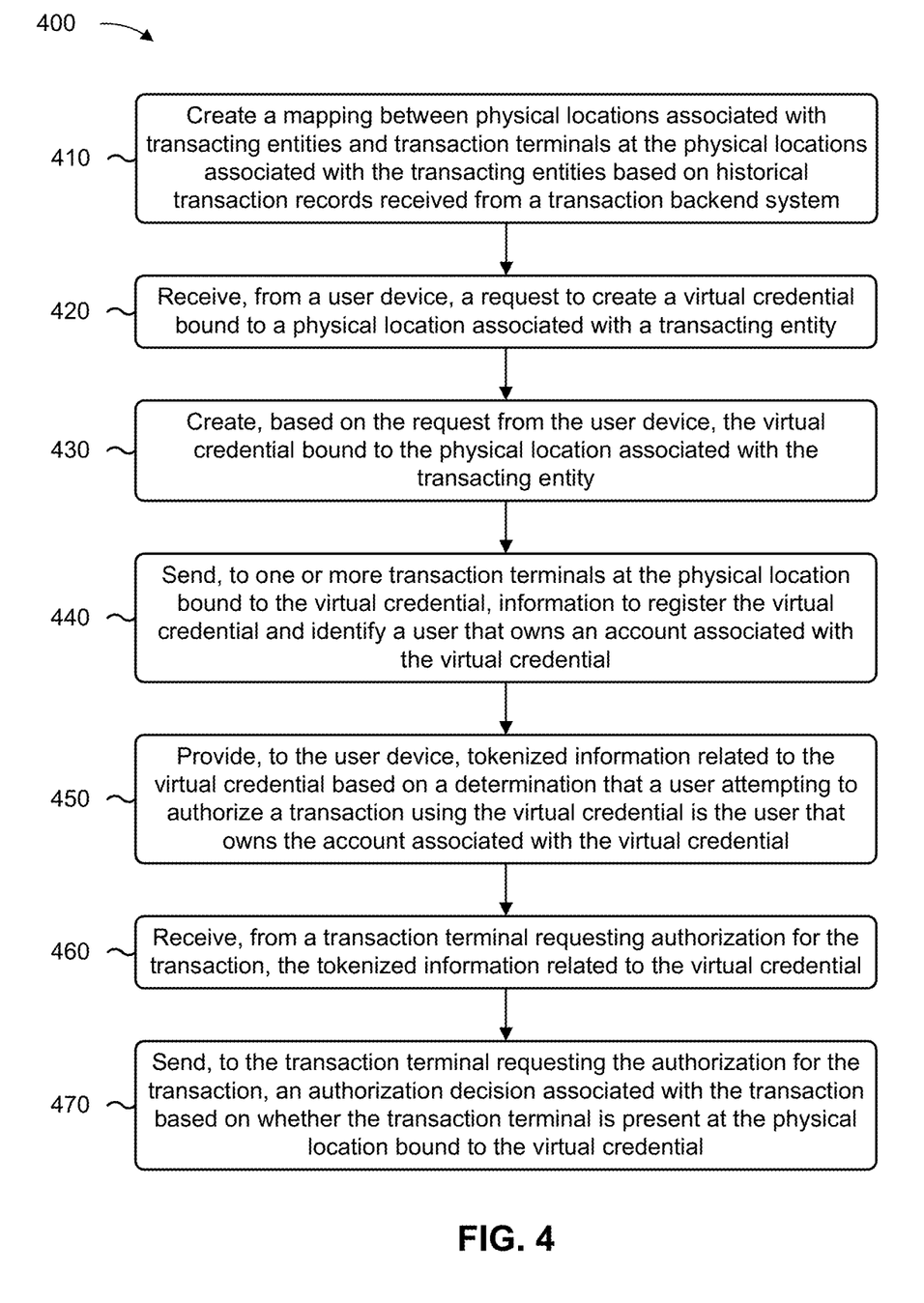
FIG. 4 is a flowchart of an example process associated with remote creation of a virtual credential bound to a physical location, in accordance with some embodiments of the present disclosure.

FIG. 4 is a flowchart of an example process 400 associated with remote creation of a virtual credential bound to a physical location. In some implementations, one or more process blocks of FIG. 4 may be performed by the credential system 250. In some implementations, one or more process blocks of FIG. 4 may be performed by another device or a group of devices separate from or including the credential system 250, such as the transaction terminal 210, the transaction device 220, the user device 230, and/or the transaction backend system 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include creating a mapping between physical locations associated with transacting entities and transaction terminals at the physical locations associated with the transacting entities based on historical transaction records received from a transaction backend system (block 410). For example, the credential system 250 (e.g., using processor 320 and/or memory 330) may create a mapping between physical locations associated with transacting entities and transaction terminals at the physical locations associated with the transacting entities based on historical transaction records received from a transaction backend system, as described above in connection with reference numbers 105, 110, and 115 of FIG. 1A. As an example, the credential system may receive raw transaction records from a transaction backend system, where the raw transaction records may include merchant metadata such as a name, city, state, zip code, country, or MCC associated with a merchant in addition to transaction metadata such as an identifier of a transaction terminal being used to perform a transaction. Accordingly, the credential system may map the merchant metadata to physical merchant locations, and may reference the transaction terminal identifiers included in the raw transaction records to create the mapping between physical merchant locations and identifiers of one or more transaction terminals that are present at each physical merchant location.

As further shown in FIG. 4, process 400 may include receiving, from a user device, a request to create a virtual credential bound to a physical location associated with a transacting entity (block 420). For example, the credential system 250 (e.g., using processor 320, memory 330, input component 340, and/or communication component 360) may receive, from a user device, a request to create a virtual credential bound to a physical location associated with a transacting entity, as described above in connection with reference numbers 120 and 125 of FIG. 1A. As an example, a user operating the user device may select a physical merchant location on a map or enter an address of a physical merchant location where the user is planning to enter into an in-person transaction, and may communicate with the credential system to remotely request creation of a virtual credential that is bound to that physical merchant location (e.g., valid only at the identified physical merchant location, and otherwise invalid with any other merchants and/or any other physical locations operated by the same merchant).

As further shown in FIG. 4, process 400 may include creating, based on the request from the user device, the virtual credential bound to the physical location associated with the transacting entity (block 430). For example, the credential system 250 (e.g., using processor 320 and/or memory 330) may create, based on the request from the user device, the virtual credential bound to the physical location associated with the transacting entity, as described above in connection with reference numbers 130 and 135 of FIG. 1B. As an example, the credential system may create a computer-generated version of a primary payment credential that can be substituted for the primary payment credential in an in-person transaction that is requested and/or authorized at the physical location bound to the virtual credential. Accordingly, the credential system may create the virtual credential, and may further associate the virtual credential with a specific physical merchant location such that the virtual credential is valid only at the specific physical merchant location.

As further shown in FIG. 4, process 400 may include sending, to one or more transaction terminals at the physical location bound to the virtual credential, information to register the virtual credential and identify a user that owns an account associated with the virtual credential (block 440). For example, the credential system 250 (e.g., using processor 320, memory 330, and/or communication component 360) may send, to one or more transaction terminals at the physical location bound to the virtual credential, information to register the virtual credential and identify a user that owns an account associated with the virtual credential, as described above in connection with reference number 140 of FIG. 1B. As an example, the credential system may reference the mapping between physical merchant locations and transaction terminal identifiers to identify one or more transaction terminals that are present at the physical merchant location bound to the virtual credential, and the credential system may send a secure message to each transaction terminal at the physical merchant location bound to the virtual credential to register information associated with the virtual credential and information associated with the user authorized to enter into transactions using the virtual credential.

As further shown in FIG. 4, process 400 may include providing, to the user device, tokenized information related to the virtual credential based on a determination that a user attempting to authorize a transaction using the virtual credential is the user that owns the account associated with the virtual credential (block 450). For example, the credential system 250 (e.g., using processor 320 and/or memory 330) may provide, to the user device, tokenized information related to the virtual credential based on a determination that a user attempting to authorize a transaction using the virtual credential is the user that owns the account associated with the virtual credential, as described above in connection with reference number 145 of FIG. 1C. As an example, the tokenized information may include a sixteen-digit number or other payment token, a reference token that is substituted for the sixteen-digit number or other payment token, or the like, which may be provided to the user device based on the user of the user device successfully authenticating a username and password and successfully performing an MFA method configured for the virtual credential.

As further shown in FIG. 4, process 400 may include receiving, from a transaction terminal requesting authorization for the transaction, the tokenized information related to the virtual credential (block 460). For example, the credential system 250 (e.g., using processor 320, memory 330, input component 340, and/or communication component 360) may receive, from a transaction terminal requesting authorization for the transaction, the tokenized information related to the virtual credential, as described above in connection with reference number 150 of FIG. 1C. As an example, the tokenized information that is sent to the user device may be presented to the transaction terminal and/or the transaction terminal may retrieve the registered information associated with the virtual credential (e.g., after verifying an identity of a user), and the transaction terminal may send an authorization request for an in-person transaction associated with the virtual credential.

As further shown in FIG. 4, process 400 may include sending, to the transaction terminal requesting the authorization for the transaction, an authorization decision associated with the transaction based on whether the transaction terminal is present at the physical location bound to the virtual credential (block 470). For example, the credential system 250 (e.g., using processor 320, memory 330, and/or communication component 360) may send, to the transaction terminal requesting the authorization for the transaction, an authorization decision associated with the transaction based on whether the transaction terminal is present at the physical location bound to the virtual credential, as described above in connection with reference numbers 155 and 160 of FIG. 1C. As an example, the credential system or a transaction backend system in communication with the credential system may verify that the transaction terminal requesting authorization for the in-person transaction is associated with the same physical merchant location bound to the virtual credential and/or may verify that location data shared by the user device indicates that a current location of the user device is within a threshold distance of the physical merchant location bound to the virtual credential (e.g., based on a comparison of latitude and longitude coordinates associated with the user device and latitude and longitude coordinates corresponding to the physical merchant location bound to the virtual credential). Accordingly, in this example, the authorization decision may indicate that the transaction is authorized if the virtual credential is being used at the physical merchant location bound to the virtual credential while the user device is at the physical merchant location bound to the virtual credential. Alternatively, the authorization decision may indicate that the transaction is declined or not authorized if the virtual credential is being used at a merchant other than a merchant bound to the virtual credential (e.g., a different merchant operating at the same physical location), a different physical location associated with the merchant bound to the virtual credential (e.g., a store other than a store that was bound to the virtual credential), and/or while the user device is at a location other than the physical merchant location bound to the virtual credential (e.g., to prevent potential fraudulent activity by the merchant).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for enabling an in-person card-not-present transaction, the system comprising:
 one or more memories; and
 one or more processors, communicatively coupled to the one or more memories, configured to:
  create a mapping between physical locations associated with financial transacting entities and financial transaction terminals at the physical locations associated with the financial transacting entities based on historical transaction records received from a transaction backend system;
  receive, from a user device, a request to create a virtual credential that is linked to a primary payment credential and is used as a substitute for the primary payment credential,
  wherein the virtual credential is bound to a physical location associated with a financial transacting entity such that the virtual credential is restricted to being valid at the physical location and is invalid at any other location;
  create, based on the request from the user device, the virtual credential bound to the physical location;
  send, to one or more financial transaction terminals at the physical location bound to the virtual credential, information to register the virtual credential and identify a user that owns an account associated with the virtual credential;
  provide, to the user device, tokenized information related to the virtual credential based on a determination that a user attempting to authorize a transaction using the virtual credential is the user that owns the account associated with the virtual credential;
  receive, from a financial transaction terminal requesting authorization for the transaction, the tokenized information related to the virtual credential; and
  send, to the financial transaction terminal requesting the authorization for the transaction, an authorization decision associated with the transaction based on whether the financial transaction terminal is present at the physical location bound to the virtual credential.

2. The system of claim 1, wherein the one or more processors are further configured to:
 determine identifiers associated with the one or more financial transaction terminals at the physical location bound to the virtual credential based on the mapping and information included in the request to indicate the physical location associated with the financial transacting entity.

3. The system of claim 1, wherein the one or more processors are further configured to:
 present, to the user device, a graphical user interface that enables identification of the physical location associated with the financial transacting entity via selection of the physical location associated with the financial transacting entity on a map or input of one or more criteria corresponding to the physical location associated with the financial transacting entity.

4. The system of claim 1, wherein the one or more processors are further configured to:
 configure a multi-factor authentication (MFA) method for the virtual credential during a session to create or manage the virtual credential,
  wherein the tokenized information related to the virtual credential is provided to the user device based on the user attempting to authorize the transaction using the virtual credential performing an authentication using the configured MFA method.

5. The system of claim 1, wherein the one or more processors are further configured to:
 receive, from the user device, information that identifies one or more geographic coordinates associated with the user device at a time when the user is attempting to authorize the transaction using the virtual credential,
  wherein the tokenized information related to the virtual credential is provided to the user device based on the one or more geographic coordinates associated with the user device matching the physical location bound to the virtual credential.

6. The system of claim 1, wherein the authorization decision indicates that the transaction is authorized based on location information, associated with the user attempting to authorize the transaction, and location information, associated with the financial transaction terminal requesting the authorization for the transaction, matching the physical location bound to the virtual credential.

7. The system of claim 1, wherein the authorization decision indicates that the transaction is declined based on location information, associated with the user attempting to authorize the transaction, or location information, associated with the financial transaction terminal requesting the authorization for the transaction, failing to match the physical location bound to the virtual credential.

8. A method for enabling an in-person card-not-present transaction, comprising:
 creating, by a credential system, a virtual credential that is linked to a primary payment credential and is used as a substitute for the primary payment credential,
  wherein the virtual credential is bound to a physical location associated with a financial transacting entity such that the virtual credential is restricted to being valid at the physical location and is invalid at any other location, and
  wherein the virtual credential is bound to the physical location based on a request from a user device that identifies the physical location;
 sending, by the credential system, to one or more financial transaction terminals at the physical location bound to the virtual credential, information to register the virtual credential and identify a user that owns an account associated with the virtual credential;
 providing, by the credential system, to the user device, tokenized information related to the virtual credential based on a determination that a user attempting to authorize a transaction using the virtual credential is the user that owns the account associated with the virtual credential;
 receiving, by the credential system, from a financial transaction terminal requesting authorization for the transaction, the tokenized information related to the virtual credential; and
 sending, by the credential system, to the financial transaction terminal requesting the authorization for the transaction, an authorization decision associated with the transaction based on whether the financial transaction terminal is present at the physical location bound to the virtual credential.

9. The method of claim 8, further comprising:
creating a mapping between physical locations associated with financial transacting entities and financial transaction terminals at the physical locations associated with the financial transacting entities based on historical transaction records received from a transaction backend system.

10. The method of claim 9, further comprising:
determining identifiers associated with the one or more financial transaction terminals at the physical location bound to the virtual credential based on the mapping and information included in the request to indicate the physical location associated with the financial transacting entity.

11. The method of claim 9, further comprising:
presenting, to the user device, a graphical user interface that enables identification of the physical location associated with the financial transacting entity via selection of the physical location associated with the financial transacting entity on a map or input of one or more criteria corresponding to the physical location associated with the financial transacting entity.

12. The method of claim 8, further comprising:
configuring a multi-factor authentication (MFA) method for the virtual credential during a session to create or manage the virtual credential,
wherein the tokenized information related to the virtual credential is provided to the user device based on the user attempting to authorize the transaction using the virtual credential performing an authentication using the configured MFA method.

13. The method of claim 8, further comprising:
receiving, from the user device, information that identifies one or more geographic coordinates associated with the user device at a time when the user is attempting to authorize the transaction using the virtual credential,
wherein the tokenized information related to the virtual credential is provided to the user device based on the one or more geographic coordinates associated with the user device matching the physical location bound to the virtual credential.

14. The method of claim 8, wherein the authorization decision indicates that the transaction is authorized based on location information, associated with the user attempting to authorize the transaction, and location information, associated with the financial transaction terminal requesting the authorization for the transaction, matching the physical location bound to the virtual credential.

15. The method of claim 8, wherein the authorization decision indicates that the transaction is declined based on location information, associated with the user attempting to authorize the transaction, or location information, associated with the financial transaction terminal requesting the authorization for the transaction, failing to match the physical location bound to the virtual credential.

16. A non-transitory computer-readable medium storing a set of instructions, the set of instructions comprising:
one or more instructions that, when executed by one or more processors of a credential system, cause the credential system to:
receive, from a user device, a request to create a virtual credential that is linked to a primary payment credential and is used as a substitute for the primary payment credential,
wherein the virtual credential is bound to a physical location associated with a financial transacting entity such that the virtual credential is restricted to being valid at the physical location and is invalid at any other location;
create, based on the request from the user device, the virtual credential bound to the physical location,
send, to one or more financial transaction terminals at the physical location bound to the virtual credential, information to register the virtual credential and identify a user that owns an account associated with the virtual credential;
provide, to the user device, tokenized information related to the virtual credential based on a determination that a user attempting to authorize a transaction using the virtual credential is the user that owns the account associated with the virtual credential;
receive, from a financial transaction terminal requesting authorization for the transaction, the tokenized information related to the virtual credential; and
send, to the financial transaction terminal requesting the authorization for the transaction, an authorization decision associated with the transaction based on whether the financial transaction terminal is present at the physical location bound to the virtual credential.

17. The non-transitory computer-readable medium of claim 16, wherein the one or more instructions further cause the credential system to:
create a mapping between physical locations associated with financial transacting entities and financial transaction terminals at the physical locations associated with the financial transacting entities based on historical transaction records received from a transaction backend system.

18. The non-transitory computer-readable medium of claim 16, wherein the one or more instructions further cause the credential system to:
configure a multi-factor authentication (MFA) method for the virtual credential during a session to create or manage the virtual credential,
wherein the tokenized information related to the virtual credential is provided to the user device based on the user attempting to authorize the transaction using the virtual credential performing an authentication using the configured MFA method.

19. The non-transitory computer-readable medium of claim 16, wherein the one or more instructions further cause the credential system to:
receive, from the user device, information that identifies one or more geographic coordinates associated with the user device at a time when the user is attempting to authorize the transaction using the virtual credential,
wherein the tokenized information related to the virtual credential is provided to the user device based on the one or more geographic coordinates associated with the user device matching the physical location bound to the virtual credential.

20. The non-transitory computer-readable medium of claim 16, wherein the authorization decision is based on location information, associated with the user attempting to authorize the transaction, and location information, associated with the financial transaction terminal requesting the authorization for the transaction, relative to the physical location bound to the virtual credential.

\* \* \* \* \*